United States Patent [19]

Taira

[11] 4,063,797
[45] Dec. 20, 1977

[54] TRANSMITTED ILLUMINATION DEVICE FOR MICROSCOPES

[75] Inventor: Akio Taira, Hachioji, Japan

[73] Assignee: Olympus Optical Co., Ltd., Tokyo, Japan

[21] Appl. No.: 621,612

[22] Filed: Oct. 10, 1975

[30] Foreign Application Priority Data

Oct. 12, 1974 Japan ................. 49-117520

[51] Int. Cl.$^2$ ............................. G02B 21/06
[52] U.S. Cl. ................................ 350/87
[58] Field of Search .................. 350/87–89

[56] References Cited

U.S. PATENT DOCUMENTS

| 3,137,761 | 6/1964 | Conradi et al. | 350/87 |
| 3,799,645 | 3/1974 | Stankewitz | 350/87 |

FOREIGN PATENT DOCUMENTS

| 4,513 | 2/1969 | Japan | 350/87 |
| 6,634 | 3/1970 | Japan | 350/87 |

Primary Examiner—David H. Rubin

[57] ABSTRACT

A transmitted illumination device for microscopes which can furnish brilliance for viewing, illuminate objects with uniform light and is compact in construction and easy in handling. The device consists of a collector lens, a detachably mounted additional lens system, a field stop, a rear lens system and a condenser lens, arranged in succession from a light source toward a test piece and optically aligned with each other. The additional lens system consists of front and rear components. The front component is composed of a convex lens and the rear component is composed of a convex lens followed by another convex lens. The rear lens system consists of front and rear components each composed of a convex lens.

6 Claims, 5 Drawing Figures

TRANSMITTED ILLUMINATION DEVICE FOR MICROSCOPES

This invention relates to a transmitted illumination device for microscopes which can furnish brilliance for viewing, illuminate objects with uniform light and is compact in construction and easy in handling.

A good illumination device is required to satisfy the following conditions.
1. The device must provide uniform illumination,
2. the device must furnish adequate brilliance for viewing,
3. the device must be provided with an illumination optical system which satisfies the numerical aperture of an objective lens, and
4. the device must cause an aperture stop and field stop to effectively operate.

In order to satisfy these conditions, an illumination device which makes use of a Köhler's illumination has heretofore been considered as the best illumination device.

The Köhler's illumination will now be described with reference to FIG. 1. In the Köhler's illumination optical system, a collector lens 1 serves to form an image $Q_1$ of a light source $Q_0$ at a focal point in front of a condenser lens 4. At this focal point is located an aperture stop 3 for controlling the amount of light incident thereon. In addition, the collector lens 1 is followed by a field stop 2 for restricting the size of the field of view. The condenser lens 4 serves to form the image of the light source $Q_0$ at a focal point infinitely distant apart therefrom, that is, at a focal point infinitely distant apart from an object or test piece S. As a result, there is no risk of lack of uniformity in illumination being produced by the shape of the light source $Q_0$. In addition, the field stop 2 can restrict the size of the field of view. In FIG. 1, $Ob$ designates an objective lens of a microscope and $Q_2$ an image of the light source $Q_0$ formed by the objective lens $Qb$.

In the conventional transmitted type microscope, the standard objective lens $Ob$ has a magnification on the order of $1 \times$ to $100 \times$, a numerical aperture of 1.4 at most, and a field aperture of 20 to 22.

In the single illumination optical system shown in FIG. 1, if it is desired to satisfy all the above described conditions, the light source $Q_0$ is required to make its area considerably large or the illumination optical system is required to make its F number extremely small. Such illumination optical system is far from the illumination optical system used in practice.

In order to satisfy all the above described conditions, it is desirous to provide an illumination device having a lens system so constructed as to be interchanged from one illumination optical system for effecting the most suitable illumination on a low magnification to another illumination optical system for effecting the most suitable illumination on a high magnification and vice versa and as to effect such interchange in a simple manner.

The interchange may be effected by the following three ways.
1. The collector lens is made interchangeable,
2. the condenser lens is made interchangeable, and
3. provision is made of an additional lens system which is made interchangeable.

Both the first and third ways are substantially the same in function of interchanging the focal distance of the collector lens and make use of two collector lenses. Since these collector lenses are located near the light source and the light source is far distant apart from the position where the test piece is located, from a quasi focal position and the like, it is difficult to interchange these two collector lenses. In addition, the distance from the light source to the collector lenses is restricted by the shape of the light source lamp.

An illumination device which makes use of the above described third way of interchange has heretofore been proposed in which between the field stop and the condenser lens is located a fixed lens system having a positive refractive power and between the collector lens and the field stop is located an additional lens system consisting of three components each composed of a convex lens. This additional lens system is inserted into the illumination device when it is operated on the high magnification and on the extremely low magnification and is removed therefrom when it is operated on the low magnification.

When the illumination device is operated on the extremely low magnification, the condenser lens is also interchanged with a new one designed to operate for the extremely low magnification.

In such conventional illumination optical system, the third component of the additional lens system located near the field stop is liable to be scratched and covered with dust. In addition, since the distance between this third component and the field stop is extremely small, the scratch, dust and the like on the third component become conspicuous on the projected image. If the distance between the third component and the field stop is made long, the focal distances of the second and third components of the additional lens system become long, and as a result, the aberration of the illumination optical system is increased.

In the conventional illumination optical system, the reasons why the additional lens system is composed of three components are as follows. If the second component is removed, the refractive power of the third component becomes weak and hence the incident light beam is not so much concentrated, and as a result, the incident light beam becomes widened. So, adequate brilliance is not furnished unless the aperture of the first component is made large. The presence of the second component ensures a sufficient concentration of the light beam and prevents a widening of the incident light beam even though the apertures of the first and second components are small.

In addition, the conventional illumination optical system has another disadvantage that the presence of the fixed lens system having the positive refractive power and located between the field stop and the condenser lens makes the overall length of the illumination device long. That is, in order to bring the front focal point and the rear focal point of the fixed lens system into in coincidence with the field stop and an aperture stop, respectively, the distance between the field stop and the aperture stop becomes substantially two times longer than the focal distance of the fixed lens system.

An object of the invention is to provide a transmitted illumination device for microscopes which can obviate the above mentioned disadvantages inherent to the above mentioned kind of the conventional transmitted illumination device for microscopes, which can make scratches, dust and the like on the additional lens system not conspicuous by dividing the additional lens system into two components and separating it from the field stop and which can make the fixed lens system compact by dividing it into two components.

A feature of the invention is the provision of a transmitted illumination device for microscopes which consists of a collector lens, a detachably mounted additional lens system, a field stop, a rear lens system and a condenser lens, arranged in succession from a light source toward a test piece and optically aligned with each other, said additional lens system consisting of two air spaced front and rear components, said front component being composed of a convex lens, said rear component being composed of a convex lens followed by another convex lens, said rear lens system consisting of two components each composed of a convex lens, said additional lens system being removed from the illumination device when it is operated on a low magnification and inserted thereinto when it is operated on a high magnification, said interchange being effected without changing the image position of the light source and with changing only the image size of the light source.

The invention will now be described in greater detail with reference to the accompanying drawings, wherein.

Figure 1:
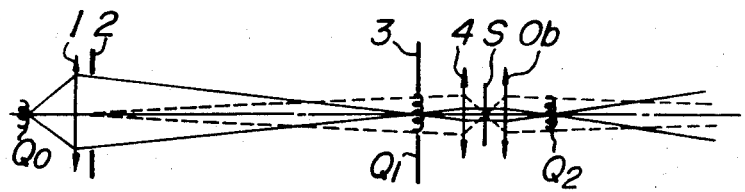
FIG. 1 is a diagrammatic view showing a constructional principle of a Köhler's illumination optical system.
Figure 2:
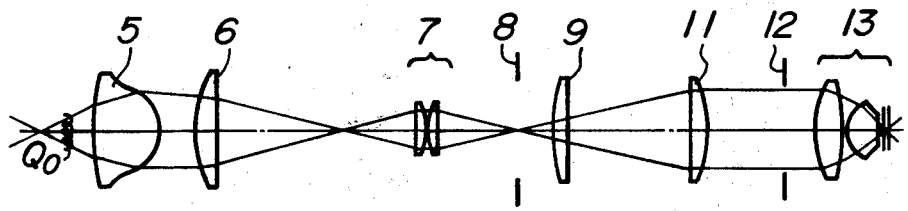
FIG. 2 is a diagrammatic view showing one embodiment of a transmitted illumination device for microscopes according to the invention when it is operated on a high magnification.
Figure 3:
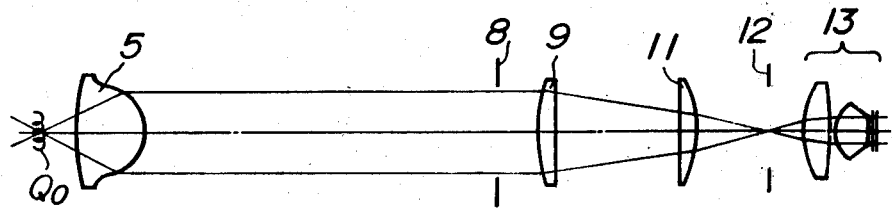
FIG. 3 shows similarly to FIG. 2 a diagrammatic view showing one embodiment of the transmitted illumination device for microscopes according to the invention when it is operated on a low magnification.
Figure 4:
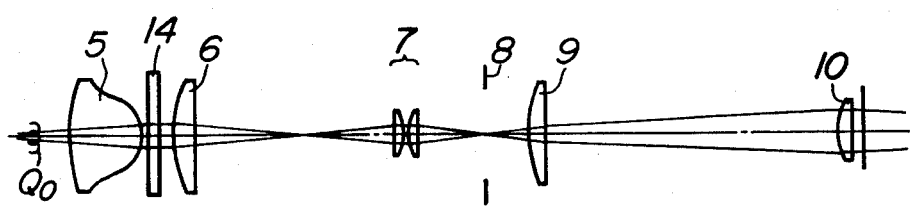
FIG. 4 shows similarly to FIG. 2 a diagrammatic view showing one embodiment of the transmitted illumination device for microscopes according to the invention when it is operated on an extremely low magnification.

In FIGS. 2, 3 and 4 are shown one embodiment of an illumination device for microscopes according to the invention when it is operated on low, high and extremely low magnifications, respectively. Here, it shall be understood that the extremely low magnification means a magnification on the order of 1× to lower than 4×, low magnification means a magnification on the order of 4× to lower than 20×, and the high magnification means a magnification of at least 20×.

In the transmitted illumination device for microscopes according to the invention when it is operated on the high magnification shown in FIG. 2, between a collector lens 5 and a field stop 8 is arranged a detachably mounted additional lens system consisting of two air spaced front and rear components 6, 7, said front component 6 being a convex lens convex toward the front and said rear component 7 being a convex lens convex toward the rear followed by a convex lens convex toward the front.

The focal distance of the additional lens system 6 and 7 is so determined that an image of a light source $Q_0$ is formed at a front focal point of a condensor lens 13.

The refractive power of the second component 7 is made large so as to obviate the necessity of enlarging the apertures of the collector lens 5 and the front component 6.

In addition, the distance between the rear component 7 and a field stop 8 is made large so as to render scratches and dust and the like on the rear component 7 not conspicuous. In the case of the high magnification of the light source image shown in FIG. 2, the numerical aperture of an objective lens (not shown) is large, so that the magnification of a light source filament image must be high. In addition, in the additional lens system, both the front and rear components 6, 7 are convex lenses, respectively. Otherwise, it would be required to make the diameter of the front component 6 and hence the diameter of the collector lens 5 considerably large.

The collector lens 5 serves to form a light source image at an infinitely distant focal point. In addition, the additional lens system 6, 7 is of an afocal lens system having a focal point infinitely distant apart therefrom. As a result, it is possible to freely change the distance between the collector lens 5 and the field stop 8.

In the transmitted illumination device according to the invention, between the field stop 8 and an aperture stop 12 is located a rear lens system consisting of front and rear components 9 and 11. The front component 9 is of a plano-convex lens convex toward the front and is fixed, whereas the rear component 11 is a convex lens and is detachably mounted.

The rear lens system 9, 11 serves to form both the image of the field stop 8 and the image of the light source $Q_0$ at given positions, respectively. As a result, the distance between the front and rear focal points is determined by conditions required for arranging the other lenses and for making the diameters of these lenses as small as possible. The use of the rear lens system consisting of two air spaced front and rear components 9 and 11 ensures an increase of a degree of freely arranging lenses.

In FIG. 3 is shown a transmitted illumination device according to the invention when it is operated on a low magnification. In this case, the additional lens system 6, 7 is removed from the illumination device.

In FIG. 4 is shown a transmitted illumination device according to the invention when it is operated on an extremely low magnification. In the present case, it is impossible to use the condenser lens 13 for high and low magnifications shown in FIGS. 2 and 3, respectively, because the condenser lens 13 has a large field of view. As a result, the condenser lens 13 is interchanged with a condenser lens 10 for an extremely low magnification and having a small field of view. In addition, the rear component 11 of the rear lens system 9, 11 is removed from the illumination device.

The illumination device for the extremely low magnification shown in FIG. 4 does not perform the Köhler's illumination. Because, an objective lens used in this device has a long focal distance, so that even though the image of the light source $Q_0$ is formed in the front focal point of the condenser lens 10, the pupil of the objective lens is not positioned at its rear focal point, and as a result, it is impossible to furnish adequate illumination.

Thus, in the illumination device for the extremely low magnification shown in FIG. 4, the field stop 8 does not operate as a field stop. The condenser lens 10 is not provided with the aperture stop 12 contrary to the illumination devices for the high and low magnifications shown in FIGS. 2 and 3. But, also in the illumination device for the extremely low magnification shown in FIG. 4, the aperture stop must effectively be operated, so that in this case, the refractive power of the condenser lens 10 is determined such that the field stop 8 can operate also as an aperture stop. In this case, if the rear component 11 of the rear lens system 9, 11 is not removed from the illumination device, the diameter of the collector lens 5 or the diameter of the additional lens system 6, 7 is required to be intentionally large for the extremely low magnification. But, if the rear component 11 is removed from the illumination device, it is possible to make the diameter of the collector lens 5 or the diameter of the additional lens system 6, 7 small.

As described above, the illumination device for the extremely low magnification shown in FIG. 4 is not capable of performing the Köhler's illumination, so that use may be made of a diffuser 14 for the purpose of eliminating non-uniformity of illumination due to the shape of the light source $Q_0$. It is preferable to locate the diffuser 14 immediately after the collector lens 5.

The diffuser 14 may also be located immediately after the collector lens 5 of the illumination devices for the high and low magnifications shown in FIGS. 2 and 3 for the purpose of eliminating nonuniformity of illumination which might be occurred when the aperture stop 12 becomes operated.

As stated hereinbefore, the illumination device according to the invention is capable of making the distance between the field stop 8 and the aperture stop 12 small by dividing the rear lens system into two air spaced front and rear components 9 and 11.

On the contrary, if the rear lens system is constituted by only one component, it is necessary to bring its front focal point into coincidence with the field stop 8 for the high magnification as shown in FIG. 2 and to bring its rear focal point into in coincidence with the aperture stop 12 for the low magnification as shown in FIG. 3. As a result, let the overall focal distance of the rear lens system 9, 11 be $f$, then the distance between the field stop 8 and the aperture stop 12 becomes equal to $2f$.

On the contrary, in the present invention, the rear lens system is divided into front and rear components 9 and 11, so that it is possible to make the distance between the field stop 8 and the aperture stop 12 shorter than $2f$. For example, let the overall focal distance of the rear lens system 9, 10 be 72 mm, then the distance between the field stop 8 and the aperture stop 12 becomes equal to 110 mm.

As explained hereinbefore, the illumination optical system according to the invention has a number of advantages. In the first place, the use of the rear lens system divided into front and rear components 9, 11 makes the construction of the illumination device as a whole compact in construction. Secondly, the diameter of the collector lens 5 and the diameter of the additional lens system 6, 7 may be made small by detachably mounting the rear component 11 of the rear lens systems 9, 11 and removing it when the illumination device is operated on the extremely low magnification. Finally, the long distance between the rear component 7 of the additional lens system and the field stop 8 makes scratches and dust on the rear component 7 not conspicuous.

Figure 5:
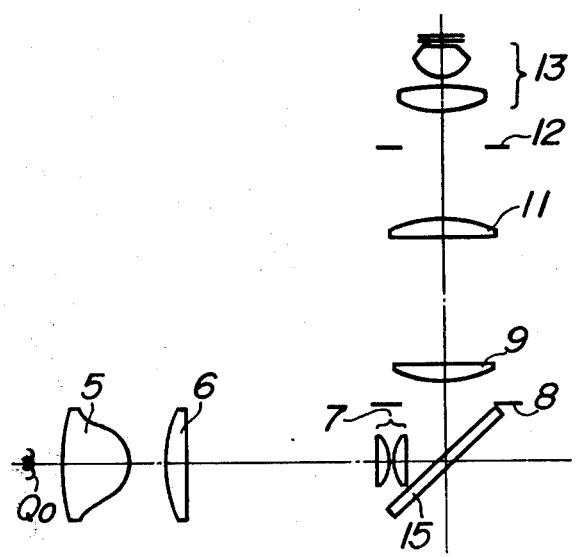
FIG. 5 is a diagrammatic view showing another embodiment of a transmitted illumination device for microscopes according to the invention when it is operated on a high magnification.

In FIG. 5 is shown another embodiment of the illumination device for the high magnification according to the invention. In the present embodiment, like parts as those shown in the previous embodiments are designated by like numerals and like symbols.

In the present embodiment, in a long space between the rear component 7 of the additional lens system 6, 7 and the field stop 8, a deflecting mirror 15 is located. Such construction is also capable of reducing the influence of scratches and dust on the rear component 7 upon the projected image.

Alternatively, the deflecting mirror 15 may be located in a long space between the front component 6 and the rear component 7 of the additional lens system 6, 7. In this case, however, it is impossible to align the front and rear components 6, 7 in a straight line optical axis.

On the contrary, in the present embodiment, the front and rear components 6, 7 of the additional lens system can be aligned in the straight line optical axis, so that the additional lens system 6, 7 as a whole can easily be removed in the case of the low magnification, thereby easily manufacturing the illumination device.

The present embodiment, also offers unlimited lens interchangeability in the case of the low magnification and extremely low magnification in the same manner as in the previous embodiments.

What is claimed is:

1. A transmitted illumination device for a microscope comprising from a light source to a test piece, a collector lens, a front detachably mounted additional system, a field stop, a rear lens system, an aperture stop and a condenser lens, said front detachably mounted additional system consisting of two air spaced front and rear components, said front component being a convex lens convex toward the front and said rear component being a convex lens system adjoining said field stop and having conjugate positions located at said field stop and at a position between said front and rear components, respectively, said rear lens system consisting of a front component composed of a fixed convex lens adjoining said field stop and a rear component air-spaced from said fixed convex lens and composed of a detachably mounted convex lens, said front additional lens system being removed from the illumination device and said rear component of said rear lens system being inserted thereinto when operated at low magnification, both said front additional lens system and said rear component of said rear lens system being inserted thereinto when operated at high magnification, the image of said light source projected onto said aperture stop with sizes corresponding to desired magnifications and the image of said field stop being projected onto an object surface by means of said rear lens system.

2. The transmitted illumination device as claimed in claim 1 wherein the rear member of the rear lens system is removable from the light path for operations on an extremely low magnification, the front lens system being inserted into the light path.

3. The transmitted illumination device as claimed in claim 1 including a diffuser between the collector lens and the front member of the front lens system.

4. The transmitted illumination device according to claim 1 including a deflecting mirror in the light path said reflecting mirror between the rear member of the front lens system and the field stop.

5. The transmitted illumination device as defined in claim 1 including a diffuser between the collector lens and the front member of the front lens system, the rear member of the rear lens system being removable from the light path for operations on an extremely low magnification, the front lens system being inserted into the light path; and a deflecting mirror in the light path, said reflecting mirror being between the rear member of the front lens system and the field stop.

6. The transmitted illumination device as claimed in claim 1, wherein said rear component of said front additional system is composed of two plano-convex lenses with convex surfaces facing each other.

* * * * *